June 6, 1950 — B. T. FONG — 2,510,394
FISHLINE DRYING REEL AND HOLDER THEREFOR
Filed Jan. 21, 1947
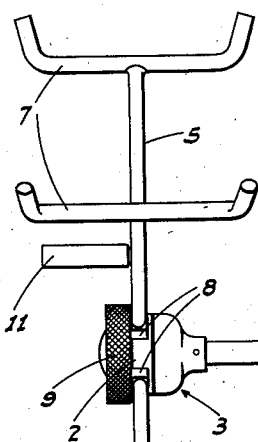
Fig. 1
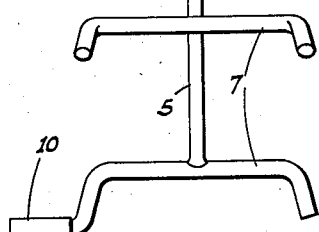
Fig. 2
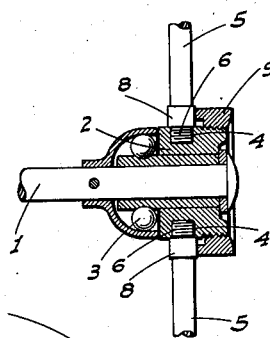
Fig. 3
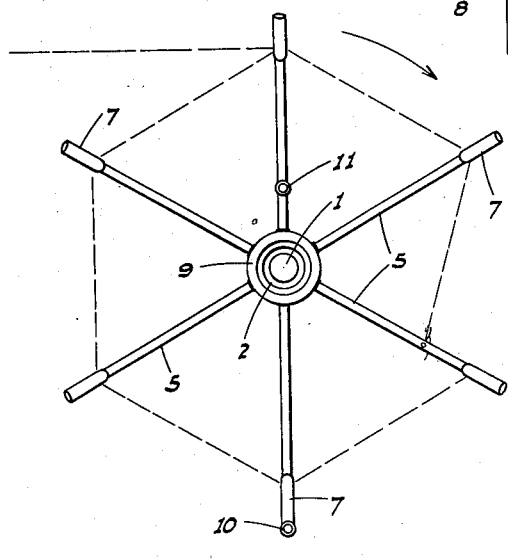
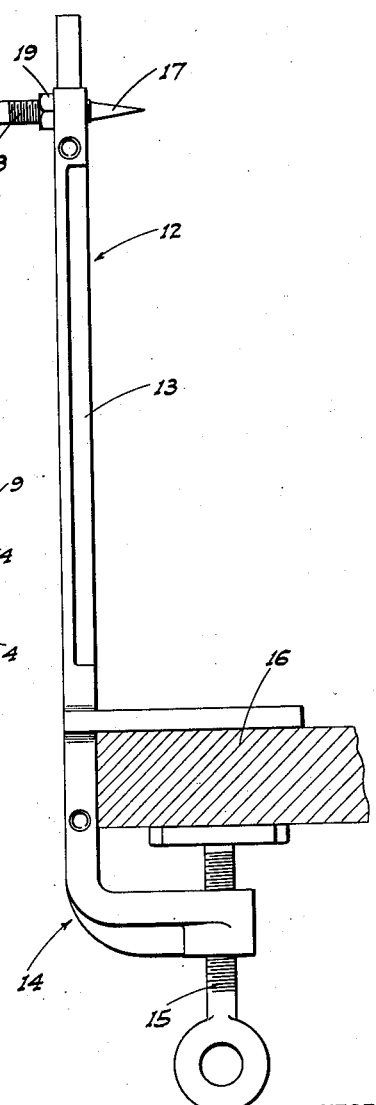
INVENTOR
Bennie T. Fong
BY
ATTORNEYS Patented June 6, 1950

2,510,394

UNITED STATES PATENT OFFICE 2,510,394

FISHLINE DRYING REEL AND HOLDER THEREFOR

Bennie T. Fong, Lodi, Calif.

Application January 21, 1947, Serial No. 723,408

4 Claims. (Cl. 242—104)

This invention is directed to, and it is an object to provide, an improved fish line drying reel; the reel being sturdy, yet light weight, and arranged to be taken apart for ease of storage, or carrying when not in use.

Another object of the invention is to provide a fish line drying reel, as above, which includes a plurality of separate, line cradle supporting spokes removably threaded into a rotary hub; there being novel means to maintain the spokes against rotation and the line cradles in proper position for use.

A further object of the invention is to embody a novel crank handle arrangement in the reel.

An additional object is to provide a novel supporting holder or bracket for the reel.

A further object of the invention is to provide a simple, practical, and convenient fish line drying reel, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the improved fish line drying reel as assembled and mounted for use.

Fig. 2 is an enlarged fragmentary sectional elevation of the hub assembly of the reel.

Fig. 3 is an outer end view of the reel.

Referring now more particularly to the characters of reference on the drawings, the reel comprises a horizontal spindle 1 supported, at its inner end, in the manner hereinafter described, and provided, at its outer or free end, with a rotary hub 2 carried by a ball bearing unit, indicated generally at 3.

The rotary hub 2 is formed with a circumferential row of equally spaced, tapped sockets 4. Spokes 5, threaded at their inner ends, as at 6, are screwed into corresponding ones of the tapped sockets 4. The spokes 5 thus radiate from the rotary hub 2, and at their outer ends said spokes are formed with transversely extending line cradles 7 which open outwardly. The spokes 5 are normally maintained against rotation, whereby the cradles 7 remain in proper transverse position, by means of enlarged rectangular heads 8 on said spokes directly outwardly of the threaded ends 6, and exteriorly of the rotary hub 2. The rectangular heads 8 are engaged on one side by a locking collar 9 threaded on the free end of the rotary hub 2; said locking collar being exteriorly knurled for ease of manipulation.

The assembled reel is adapted to be rotated by means of a hand crank 10 formed on the outer end of one of the line cradles 7, or by another hand crank 11 projecting laterally outwardly from one of the spokes 5.

The above described reel is supported by a holder or bracket, indicated generally at 12, which comprises a post 13 formed at one end with a C-clamp, indicated generally at 14, which C-clamp includes a hand screw 15. The C-clamp 14 is engaged with one edge portion of a bench or table 16 and clamped therewith by means of the hand screw 15, with the post 13 upstanding.

At the end opposite the reel the spindle 1 is formed with a sharp point 17, and adjacent said point is threaded, as at 18. When the spindle 1 is mounted in connection with the post 13, the portion 18 is threaded through the post 13 adjacent its upper end, and locked with said post by a nut 19.

If a bench or table is not available for attachment of the bracket 12, the spindle 1 when unthreaded from the post 18 can be driven into a tree or board, by reason of the sharp point 17 with which said spindle is provided.

The described reel when in use is quite practical and convenient; the fish line to be dried being anchored to one of the spokes 5 and then wound about the reel in the cradles 7, in the manner indicated by broken lines in Fig. 3. After the line is dry and removed from the reel the latter can be taken apart, for ease of storage or carrying, by unloosening the locking collar and unthreading the spokes 5 from the rotary hub 2. Also, the spindle 1 is removed from the post 13, and the bracket 12 detached from the bench or table 16. The bracket 12 is also adapted for use in connection with the sportman's devices shown in copending applications, Serial Nos. 723,409 and 723,410, now Patent Nos. 2,486,142 and 2,466,801.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as set forth in the appended claims.

Having thus described the invention, the following is claimed as new and useful, and upon which Letters Patent are desired:

1. A fish line drying reel comprising a spindle adapted to be mounted horizontally with one end free, a rotary hub on said one end of the spindle, spokes radiating from the hub and being screw threaded into the hub, transverse, outwardly opening cradles on the outer ends of the spokes, and releasable means to prevent rotation of the spokes about their longitudinal axes when the cradles are positioned transversely of the reel for use, such releasable means including a locking collar threaded on the hub and bearing against the sides of the spokes.

2. A fish line drying reel comprising a spindle adapted to be mounted horizontally with one end free, a rotary hub on said one end of the spindle, spokes radiating from the hub, the inner ends of the spokes removably threading into the hub, the spokes having enlarged, flat sided heads thereon adjacent the hub, a removable locking collar threaded on the hub and bearing against said flat sides to prevent rotation of the spokes about their longitudinal axes, and transverse, outwardly opening cradles on the outer ends of the spokes.

3. A fish line drier comprising a spindle, means to support the spindle, a hub mounted for rotation at the outer end of the spindle, a plurality of spokes, a line cradle mounted on the outer end of each spoke, the inner end of each spoke being threaded, a fixed rectangular head on each spoke at the outer end of the threading thereon, the hub having threaded orifices for the reception of the threaded portions of the spokes, the rectangular heads functioning to positively stop the threading of the spokes into the hub with the line cradles all disposed at substantially right angles to the plane of rotation of the hub on the spindle, and a locking collar threaded on the end of the hub and engageable with all of the rectangular heads of the spokes whereby to prevent rotation of the spokes about their longitudinal axes when the reel is in use.

4. A fish line drying reel as in claim 1 in which the spokes have flat sides, the collar being engageable against said sides.

BENNIE T. FONG.

REFERENCES CITED

The following references are of record in the file of this patent:

UNITED STATES PATENTS

| Number | Name | Date |
|---|---|---|
| 1,048,558 | Markiewicz | Dec. 31, 1912 |
| 1,286,085 | Peters | Nov. 26, 1918 |
| 1,444,154 | Jenks | Feb. 6, 1923 |
| 2,001,570 | Fenton | May 14, 1935 |

FOREIGN PATENTS

| Number | Country | Date |
|---|---|---|
| 536 | Great Britain | Mar. 3, 1864 |
| 353,906 | France | July 11, 1905 |